United States Patent [19]

Nakajima et al.

[11] 3,918,722

[45] Nov. 11, 1975

[54] TONE ARM

[75] Inventors: Heitaro Nakajima; Hirotake Kawakami, both of Tokyo; Shiyokichi Tatara, Kanagawa, Japan

[73] Assignee: Sony Corporation, Tokyo, Japan

[22] Filed: July 3, 1974

[21] Appl. No.: 485,449

[30] Foreign Application Priority Data

July 9, 1973 Japan .............................. 48-81381
July 9, 1973 Japan .............................. 48-81382

[52] U.S. Cl. ............................ 274/23 R; 274/23 R
[51] Int. Cl.[2] ............................................ Q11B 3/10
[58] Field of Search ................ 274/23 R, 37; 264/29

[56] References Cited

UNITED STATES PATENTS

| | | | |
|---|---|---|---|
| 1,321,178 | 11/1919 | Wolff | 274/23 R |
| 2,509,356 | 5/1950 | Kilgour | 274/37 |
| 3,556,537 | 1/1971 | Stacy | 274/23 R |
| 3,818,082 | 6/1974 | Burns et al. | 264/29 |

*Primary Examiner*—Richard E. Aegerter
*Assistant Examiner*—Charles E. Phillips
*Attorney, Agent, or Firm*—Hill, Gross, Simpson, Van Santen, Steadman, Chiara & Simpson

[57] ABSTRACT

A tone arm for a phonograph comprising an elongated member composed of carbonaceous fibers held in place by means of a binder. The invention also deals with a method of manufacturing such a tone arm by winding one or more resin impregnated sheets of carbonaceous fiber about a flexible mandrel, positioning the wound mandrel in a mold, applying heat and pressure to the wound mandrel in the mold, withdrawing the mandrel from the mold while the mold is still in its heated condition, and thereafter opening the mold and withdrawing therefrom a solidified tone arm.

9 Claims, 9 Drawing Figures

TONE ARM

BACKGROUND OF THE INVENTION

1. Field of the Invention

The present invention is in the field of tone arms for phonograph record players and involves an improved material and construction for such tone arms.

2. Description of the Prior Art

In any phonograph record player, the characteristics of the tone arm have a limiting factor as far as quality of reproduction is concerned. For example, in the lower frequency ranges, the resonance frequency of the arm may itself be a limiting factor in the overall sound reproducing system.

Assume that the equivalent mass of a tone arm including a cartridge is $m_t$, and the equivalent stiffness of an armature holding portion is Sb, which is equal to 1/Cb, the arm resonance frequency and hence the low frequency reproduction limit $f_L$ is expressed as follows:

$$f_L = \frac{1}{2\pi\sqrt{m_t \cdot Cb}} \quad (1)$$

It has been known that the best value for the arm resonance frequency $f_L$ is about 10 hertz between the frequency of noise due to warping or eccentricity of a record, and the frequency of noise produced by vibration of the phonograph motor.

Heretofore, the tone arm has been made of a metal such as aluminum having a hollow interior. This aluminum tone arm is required to have a relatively large mass to some extent in order to provide predetermined rigidity, so that the above described equivalent mass of the tone arm becomes relatively great if the arm resonance frequency $f_L$ is to be reduced to a variable value, for example, on the order of several hertz. For this reason, in prior art pickup systems having such a tone arm, may be produced noise due to warping or eccentricity of a record and hence tone quality in the lower frequencies is not satisfactory.

On the other hand, the entire pickup system may be regarded as a physical pendulum which vibrates in the thickness direction of the disc, having a period T in seconds expressed as follows:

$$T = 2\pi\sqrt{\frac{I}{Mgh}} \quad (2)$$

Where M is the static mass of the entire pickup system expressed in grams, I is the moment of inertia around the fulcrum, expressed as gram centimeters squared, $h$ is the distance between the center of gravity and the fulcrum expressed in centimeters, and $g$ is the accelleration due to gravity. Assuming that the stylus pressure is W grams and the distance between the stylus tip and the fulcrum is L centimeters, the equation $h = WL/M$ is obtained. If the radius of gyration about the center of gravity is taken as $k$ measured in centimeters, the equation $I = M(k^2 + h^2)$ is obtained, and hence the period T of the equation 2 becomes as follows:

$$T = 2\pi\sqrt{\frac{K^2 + \left(\frac{WL}{M}\right)^2}{\frac{gWL}{M}}} \quad (3)$$

Now assume that there are two pickup systems with the stylus pressure W and the distance L between the stylus tip and the fulcrum are the same for both systems, but the total static masses thereof are different, such masses being expressed as $M_1$ and $M_2$, the ratio of the periods $T_1$ and $T_2$ is derived from equation 3 as follows:

$$\frac{T_1}{T_2} \approx \sqrt{\frac{k_1^2 + \left(\frac{WL}{M_1}\right)^2}{k_2^2 + \left(\frac{WL}{M_2}\right)^2} \cdot \frac{M_1}{M_2}} \quad (4)$$

where $k_1$ and $k_2$ are, respectively, the radii of gyration around the center of gravity of each system. In this case, since $k_1$ is much greater than WL divided by $M_1$ and $k_2$ is much greater than WL divided by $M_2$, and $k_1$ is approximately equal to $k_2$, the following approximation is obtained:

$$\frac{T_1}{T_2} \approx \sqrt{\frac{M_1}{M_2}} \quad (5)$$

From the following, it will be seen that if the pickup system is considered a pendulum, a period T is proportional to the square root of the static mass M of the total system, and hence the smaller the mass M, the smaller the period T, with the result that the conformability of the system to a warped record is improved. However, with a conventional tone arm made of aluminum with relatively large mass in order to provide predetermined rigidity, the mass M of the total system becomes relatively great and the period T becomes large with the result that the conformability to a warped record is not significantly improved.

SUMMARY OF THE INVENTION

The present invention is directed to a tone arm which includes an elongated member composed of carbonaceous fibers held in place by means of a binder. By "carbonaceous fibers" we mean high strength, high modulus fibers composed of either carbon or graphite. Such fibers can be produced by a variety of processes and are commercially available materials.

The present invention provides a tone arm which has a small mass while having a predetermined rigidity. The tone arm of the present invention has a resonance frequency which does not coincide with the noise frequencies generated by virtually warped or otherwise eccentric records. The tone arm of the present invention has a short period when viewed as a physical pendulum so that its conformability to a warped record is good.

The carbon fibers in accordance with the present invention may be used in the form of a woven fabric to increase the rigidity.

A tone arm of the present invention can be manufactured by a method which is simple to carry out and can be used to produce tone arms of various shapes.

Other features and advantages of the present invention will be apparent from the following description taken in conjunction with the accompanying drawings.

DESCRIPTION OF THE PREFERRED EMBODIMENTS

Figure 1:
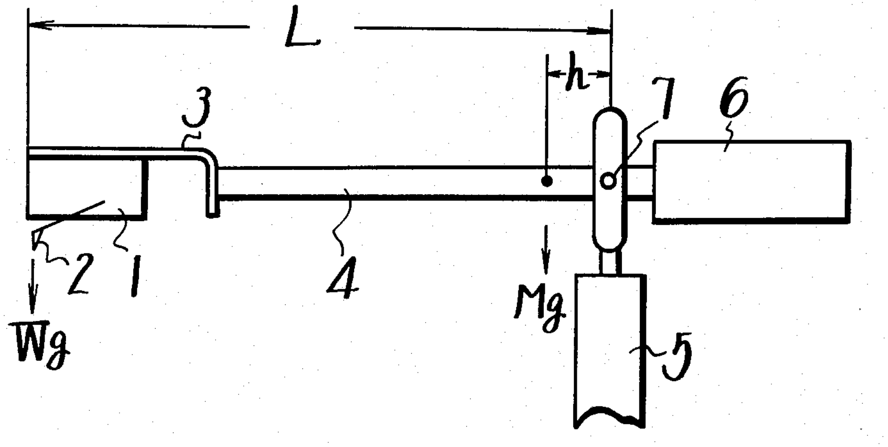
FIG. 1 is a schematic side view of a tone arm assembly of conventional form.

The typical pickup assembly for record players is illustrated in FIG. 1 of the drawings, wherein reference numeral 1 has been applied to a cartridge which carries a stylus 2 and is supported by means of a shelf 3 from a tone arm 4. An adapter 5 is provided together with a counter balancing weight 6 and a rotary fulcrum 7 for the tone arm 4.

Figure 2:
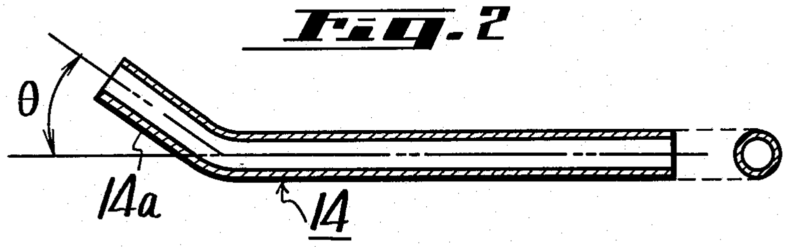
FIG. 2 is a cross sectional side view of a tone arm produced according to this invention.

In accordance with the present invention, FIG. 2 illustrates an elongated hollow tone arm 14 which is composed of carbonaceous fibers which are integrally formed by means of a thermosetting resin binder, such as a phenolic resin, polyester resin and epoxy resin, or the like. The tone arm 14 has formed at one end thereof, a portion 14a providing an offset angle $\theta$. The thermosetting resin is impregnated into the carbonaceous fibers to an extent of about 30 to 40% by weight of the fibers and is in a condition where it can be thermoset by heat and pressure to form a rigid matrix for the carbonaceous fibers.

Carbon fibers which are formed through the use of thermosetting resins have a modulus longitudinal elasticity E of about 14,000 kilograms per square millimeter, which is about twice that of aluminum, and specific gravities of about 1.2, which is less than half that of aluminum.

Accordingly, the tone arm 14 of the present invention even with a cross section substantially equal to that of a conventional tone arm made of hollow aluminum, has an extremely improved rigidity. Furthermore, its resistance to torsion is increased while its equivalent mass is relatively decreased.

Figure 3:
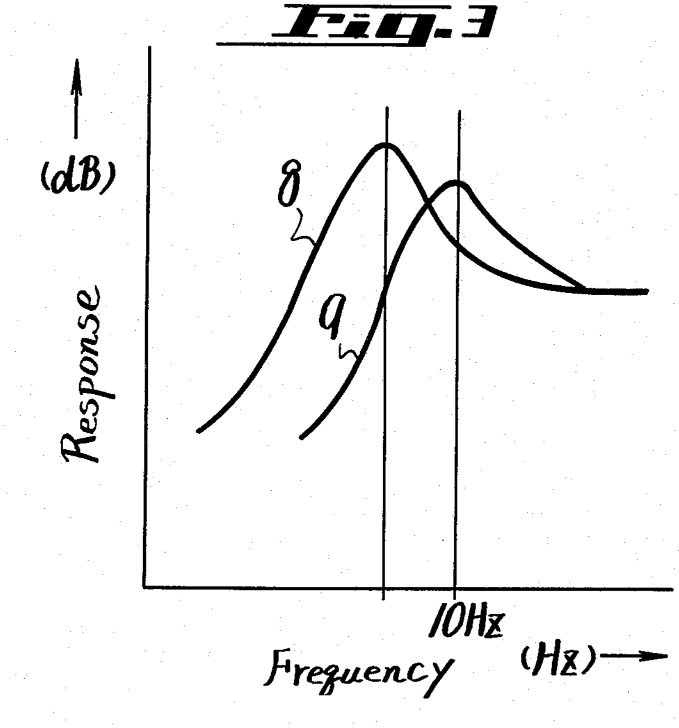
FIG. 3 is a graph demonstrating the frequency characteristics of a conventional tone arm and a tone arm produced according to the present invention.

Since the tone arm 14 according to the present invention is small in equivalent mass as described above, it will be apparent from equation 1 that the arm resonance frequency or low sound reproduction limit frequency $f_L$ can be increased. In other words, when a cartridge having compliance is employed, the arm resonance frequency $f_L$ of the conventional tone arm made of aluminum becomes lower than 10 hertz, as shown in FIG. 3 by curve 8, but the arm resonance frequency $f_L$ of the tone arm 14 according to the present invention can be about 10 hertz between the frequency of noise due to a warped or eccentric record and the frequency of noise due to the vibration of the phonograph motor. Accordingly, with the tone arm of the present invention, the noise due to warping or eccentricity of the recording disc does not appear, and tone quality in the lower sound range is improved. In addition, since the equivalent mass of the tone arm can be made quite small, the mass of the entire pickup system also becomes small and the period T as a physical pendulum becomes small as apparent from equation 5 with the result that the conformability to a warped recording disc is improved.

A method of manufacturing the tone arm 14 with an offset angle as shown in FIG. 2 is described in conjunction with FIGS. 4 to 7, inclusive.

Figure 4:
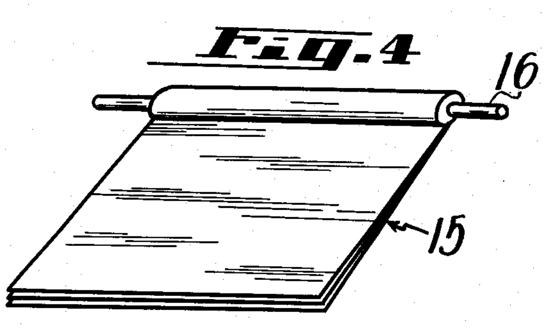
FIG. 4 is a schematic view in perspective showing an initial stage in the process of manufacturing the tone arm.
Figure 5:
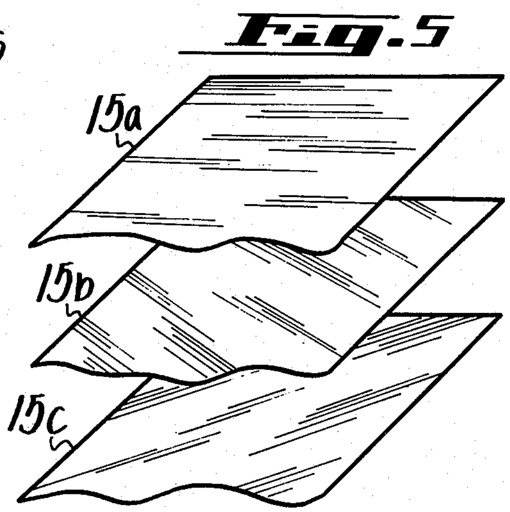
FIG. 5 is an exploded view of resin impregnated sheets of carbonaceous fibers of the type shown in FIG. 4.
Figure 6:
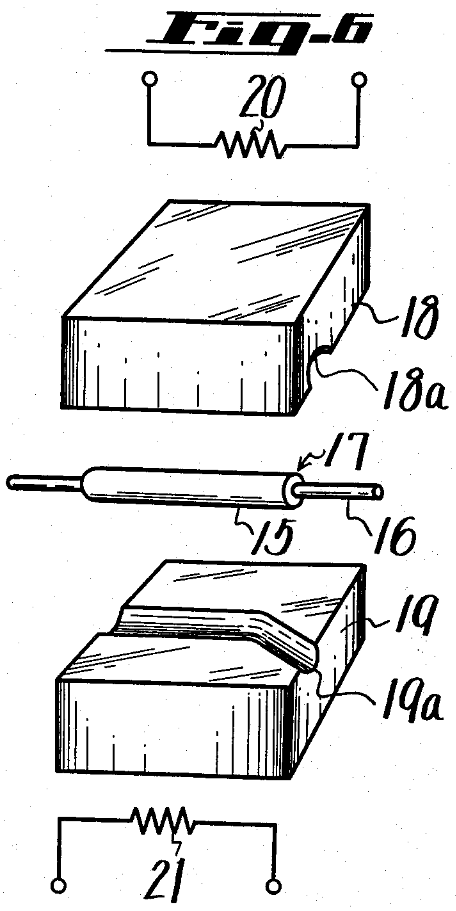
FIG. 6 is a schematic and exploded perspective view of a device for manufacturing the tone arm according to the present invention.

As shown in FIG. 4, a plurality of resin impregnated sheets or members 15 containing carbon fibers having longitudinally oriented fibers are wound about a heat resisting flexible mandrel 16 made, for example, of a silicone rubber to form a wound mandrel 17 (FIG. 6). It should be noted that the plurality of pre-impregnated sheets of carbon fibers are composed, for example, sheets 15*a*, 15*b* and 15*c*, the carbon fibers in one of the sheets running parallel to the long dimension of the finished tone arm, with others of the sheets having their carbon fibers aligned at an angle which intersects the longitudinal axis of the long dimension. By staggering the longitudinal directions of the fibers in different plies, the rigidity of the resulting laminate is improved, and the resistance to shear is also improved. The showing in FIG. 5 includes only three such sheets, but of course, many sheets can be laminated as required.

The sheet 15 wound around the mandrel 16 is then positioned within a mold assembly containing upper and lower metal molds 18 and 19, respectively, as shown in FIG. 6. Both the upper and lower metal molds 18 and 19 are provided with shaping surfaces such as J-shaped concave grooves 18*a* and 19*a*, respectively. The wound mandrel 17 is placed in the concave grooves 19*a* of the lower mold 19, and thereafter, the two mold members are brought together with suitable pressure being exerted by the mold members. Simultaneously, the wound mandrel 17 is heated by heaters 20 and 21. In the case of using an epoxy resin as a binding agent for the carbonaceous fibers, the pressure may be on the order of 10 kilograms per square centimeter, and the temperature raised to about 170°C., and maintaining these conditions for about 30 minutes.

Figure 7:
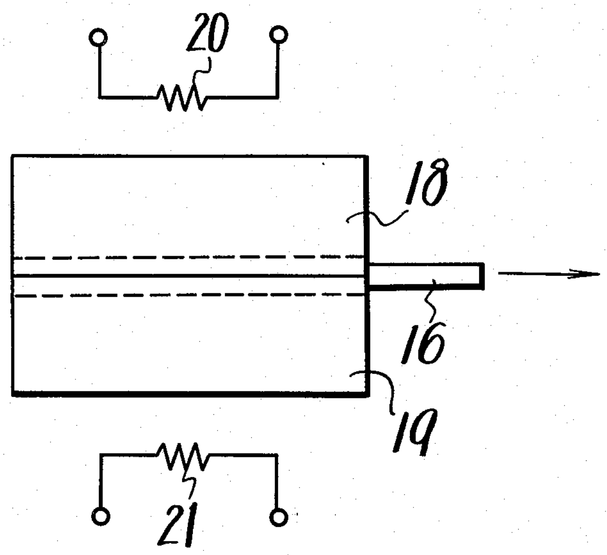
FIG. 7 is a schematic front view illustrating the final stages of the process.

Next, the mandrel 16 is withdrawn from the upper and lower metal mold members 18 and 19 while the mold members are still applying pressure to the carbon fiber plies. This condition is illustrated in FIG. 7 of the drawings. Thus, only rigidified carbonaceous fibers of the shape desired in the final structure remain inside the metal molds 18 and 19. After the metal molds 18 and 19 are disengaged, the tone arm in the form shown in FIG. 2 is withdrawn in completed form. The arm may then be further heat treated at a temperature of 170°C for about 2 hours in order to improve its thermal resistance and periodic variation characteristics.

With the above arrangement, it will be understood that some of the fibers will be oriented parallel to the long dimension of the tone arm, while others will be oriented at an angle which intersects the radial dimension. In addition, the fibers may be provided in the woven fabric form instead of as discrete filaments.

It should be obvious that a tone arm of S-shape or other shapes can be very easily formed, depending upon the shapes of the grooves provided within the metal molds.

Figure 8:
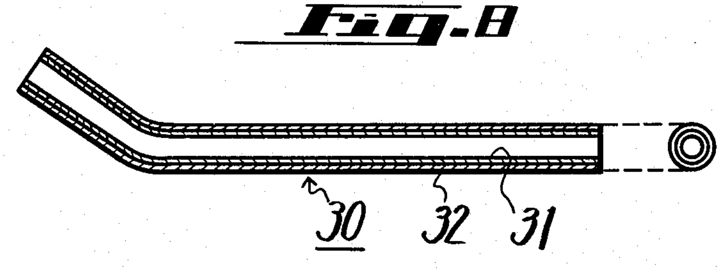
FIGS. 8 and 9 are cross sectional side views of different embodiments of the present invention.

FIG. 8 illustrates another embodiment of the invention consisting of a tone arm 30. In this form of the invention, an aluminum tube 31 having a small wall thickness has formed about it a carbon fiber layer 32 which is rigidified by the presence of a thermosetting resin, such as an epoxy resin. In this embodiment also, a plurality of carbonaceous fiber sheets are laminated on the surface of the aluminum tube 31 with the fibers being arranged in the axial direction or in directions at acute angles thereto. The tone arm 30 behaves substantially the same as the previously described tone arm in terms of its acoustic properties. Although carbon fibers are expensive as compared with aluminum at the present time, a relatively inexpensive tone arm can be provided by using a small amount of carbon fibers.

Figure 9:
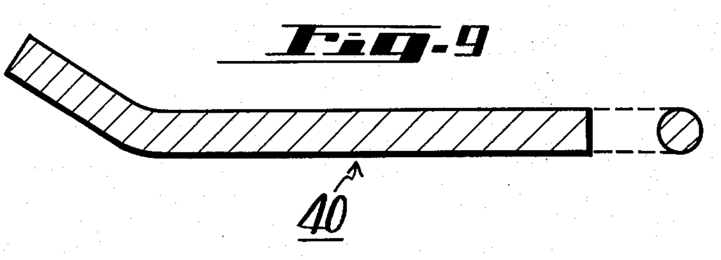

FIG. 9 illustrates still another form of the invention employing a tone arm 40. The tone arm 40 is formed of a solid elongated shape by means of the carbonaceous fibers and the resin matrix. With this embodiment, it is possible to form a very slender tone arm. This tone arm 40 can be constructed in such a manner that carbon fibers are cut off in a number of pieces of several millimeters in length and thermosetting resin is added thereto so that the assembly can be heat and pressure molded or injection molded.

It will be apparent that a number of variations can be effected without departing from the scope of the novel concepts of the present invention. For example, while the tone arms shown in FIGS. 2, 8 and 9 are all circular in cross section, other cross-sectional shapes can be used as well.

We claim as our invention:

1. A tone arm for use with a phonograph, said tone arm being composed of fibers composed of carbon held in place by means of a resinous binder, said arm being elongated and having at one end a stylus mounted thereto and being pivotally mounted near the opposite end, said tone arm having a resonant frequency which does not coincide with the noise frequencies generated by eccentric records.

2. A tone arm according to claim 1, in which the binder is a thermosetting resin.

3. A tone arm according to claim 1, in which at least some of said fibers are disposed at angles which intersect the major axis of said member.

4. A tone arm according to claim 1, in which said fibers are contained in a plurality of laminated plies, the fibers in one of said plies being oriented along the major axis of said member, and the fibers in another of said plies being oriented in a different direction.

5. A tone arm according to claim 1, in which said member is tubular.

6. A tone arm according to claim 1, which includes an offset end portion.

7. A tone arm according to claim 1, in which the elongated arm includes a woven fabric of said fibers.

8. A tone arm for use with a phonograph, said tone arm being composed of fibers composed of carbon held in place by means of a resinous binder, said held together fibers being laminated onto a metallic tube, said arm being elongated and having at one end a stylus mounted thereto and having means for pivotal mounting near the opposite end, said tone arm having a resonant frequency which does not coincide with the noise frequencies generated by eccentric records.

9. A tone arm according to claim 8 in which said carbon fibers are in the form of woven fabric.

* * * * *